US007974235B2

(12) United States Patent
Ghozati et al.

(10) Patent No.: US 7,974,235 B2
(45) Date of Patent: Jul. 5, 2011

(54) SECURE LOCATION SESSION MANAGER

(75) Inventors: Kambiz Ghozati, Ellicott City, MD (US); Dara Ung, Harwood, MD (US); Kyle Greenwell, Laurel, MD (US); Tojo Thomas, Odenton, MD (US); William Wells, Federal Way, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 354 days.

(21) Appl. No.: 11/709,058

(22) Filed: Feb. 22, 2007

(65) Prior Publication Data

US 2008/0113671 A1 May 15, 2008

Related U.S. Application Data

(60) Provisional application No. 60/858,337, filed on Nov. 13, 2006.

(51) Int. Cl.
*H04W 4/00* (2009.01)
(52) U.S. Cl. ............ 370/328; 455/456.1; 455/456.2; 455/456.3
(58) Field of Classification Search ............ 370/328, 370/338; 455/404.2, 414.2, 432.1, 433, 456.1, 455/456.2, 456.3
See application file for complete search history.

(56) References Cited

U.S. PATENT DOCUMENTS

| 5,719,918 | A | 2/1998 | Serbetciouglu |
| 5,889,473 | A | 3/1999 | Wicks |
| 5,920,820 | A | 7/1999 | Qureshi |
| 6,038,444 | A | 3/2000 | Schipper |
| 6,073,004 | A | 6/2000 | Balachandran |
| 6,073,015 | A | 6/2000 | Berggren |
| 6,119,014 | A | 9/2000 | Alperovich |
| 6,219,669 | B1 | 4/2001 | Haff |
| 6,266,614 | B1 | 7/2001 | Alumbaugh |
| 6,353,621 | B1 | 3/2002 | Boland |
| 6,370,242 | B1 | 4/2002 | Speers |
| 6,373,930 | B1 | 4/2002 | McConnell et al. |
| 6,381,535 | B1 | 4/2002 | Durocher et al. |

(Continued)

FOREIGN PATENT DOCUMENTS

WO WO2005/051033 6/2005

(Continued)

OTHER PUBLICATIONS

PCT International Search Report (PCTUS2007/23714) and Written Opinion of International Searching Authority, Apr. 18, 2008.

(Continued)

*Primary Examiner* — Jayanti K Patel
*Assistant Examiner* — Jung Park
(74) *Attorney, Agent, or Firm* — William H. Bollman

(57) ABSTRACT

A Secure Location Session Manager (SLSM) is an intelligent router for open mobile alliance (OMA) Secure User Plane Location (SUPL) Version 1.0 (and later) messages best implemented when multiple, geo-diverse SUPL servers are deployed in a distributed environment, such as an active-active redundant configuration within a wireless carrier's network. In a standalone option, the SLSM acts as a "middleman" for all SUPL positioning messages between a mobile device and a responsible SUPL server. In an embedded option, the SLSM resides within an existing server. The SLSM manages and stores session information for all pending and ongoing SUPL positioning sessions in internal tables for routing and load balancing purposes. The external interfaces of the SLSM consist of OMA ULP messages.

15 Claims, 9 Drawing Sheets

Standalone Session Router with full URL in the extended protocol

U.S. PATENT DOCUMENTS

| | | |
|---|---|---|
| 6,397,064 B1 | 5/2002 | Bridges |
| 6,421,707 B1 | 7/2002 | Miller |
| 6,473,622 B1 | 10/2002 | Meuronen |
| 6,480,710 B1 | 11/2002 | Laybourn |
| 6,487,180 B1 | 11/2002 | Borgstahl |
| 6,487,602 B1 | 11/2002 | Thakker |
| 6,512,930 B2 | 1/2003 | Sandegren |
| 6,526,351 B2 | 2/2003 | Whitham |
| 6,609,004 B1 | 8/2003 | Morse |
| 6,621,810 B1 | 9/2003 | Leung |
| 6,728,635 B2 | 4/2004 | Hamada |
| 6,731,943 B1 | 5/2004 | McCormick |
| 6,879,835 B2 | 4/2005 | Greene |
| 6,985,742 B1 | 1/2006 | Giniger |
| 6,993,325 B1 | 1/2006 | Waesterlid |
| 7,072,665 B1 | 7/2006 | Blumberg |
| 7,016,717 B2 | 9/2006 | Rousseau et al. |
| 7,120,418 B2 | 10/2006 | Herajarvi |
| 7,240,108 B2 | 7/2007 | Smith |
| 7,386,588 B2 | 6/2008 | Mousseau |
| 7,392,038 B1 | 6/2008 | Ratschunas |
| 2001/0034224 A1 | 10/2001 | McDowell |
| 2002/0093435 A1 | 7/2002 | Baron |
| 2002/0098851 A1 | 7/2002 | Walczak |
| 2002/0183072 A1 | 12/2002 | Steinbach |
| 2003/0008661 A1 | 1/2003 | Joyce |
| 2003/0017832 A1 | 1/2003 | Anderson |
| 2003/0022664 A1 | 1/2003 | Goldstein |
| 2003/0058096 A1 | 3/2003 | Shteyn |
| 2003/0086422 A1 | 5/2003 | Klinker et al. |
| 2003/0119525 A1 | 6/2003 | Rajkotia |
| 2003/0120826 A1 | 6/2003 | Shay |
| 2003/0155413 A1 | 8/2003 | Kovesdi |
| 2005/0004968 A1 | 1/2005 | Mononen |
| 2005/0064884 A1 | 3/2005 | Dumont |
| 2005/0132060 A1 | 6/2005 | Mo |
| 2005/0141522 A1 | 6/2005 | Kadar |
| 2005/0250516 A1* | 11/2005 | Shim .......................... 455/456.1 |
| 2006/0036680 A1* | 2/2006 | Shim .............................. 709/203 |
| 2006/0058042 A1* | 3/2006 | Shim .......................... 455/456.3 |
| 2006/0079249 A1* | 4/2006 | Shim .......................... 455/456.1 |
| 2006/0194595 A1 | 8/2006 | Myllynen |
| 2006/0225090 A1 | 10/2006 | Shim et al. |
| 2007/0037585 A1* | 2/2007 | Shim .......................... 455/456.1 |
| 2007/0072624 A1* | 3/2007 | Niemenmaa et al. ...... 455/456.1 |
| 2007/0082681 A1* | 4/2007 | Kim et al. .................. 455/456.1 |
| 2007/0082682 A1* | 4/2007 | Kim et al. .................. 455/456.1 |
| 2007/0110076 A1 | 5/2007 | Brouwer |
| 2007/0167177 A1* | 7/2007 | Kraufvelin .................... 455/466 |
| 2007/0182547 A1* | 8/2007 | Wachter et al. .......... 340/539.13 |
| 2007/0243885 A1* | 10/2007 | Shim .......................... 455/456.2 |
| 2008/0109650 A1* | 5/2008 | Shim et al. .................... 713/151 |

FOREIGN PATENT DOCUMENTS

| | | | |
|---|---|---|---|
| WO | WO /2006/075856 | * | 7/2006 |

OTHER PUBLICATIONS

PCT International Search Report in PCT/US2007/23714 dated Oct. 27, 2008.

International Search Report in PCT/US2007/23243 dated Apr. 2, 2008.

Open Mobile Alliance, User Plane Location Protocol Candidate Version 1.0, OMA-TS-ULP-V1_0-20060127-C, Jan. 27, 2006, pp. 1-66.

Open Mobile Alliance, Secure User Plane Location Architecture Candidate Version 1.0, OMA-AD-SUPL-V!_0-20060127-C, Jan. 27, 2006, pp. 1-80.

Newsletter "Sonera Bill Warning" Digital Cellular Report. Stevenage: Jun. 17, 1998. vol. 4, Iss.; p. 1.

* cited by examiner

SECURE LOCATION SESSION MANAGER

This application claims priority from U.S. Provisional Patent Appl. No. 60/858,337, filed Nov. 13, 2006, entitled "SUPL Intelligent Session Router" to Ghozati et al., the entirety of which is expressly incorporated herein by reference.

BACKGROUND OF THE INVENTION

1. Field of the Invention

This invention relates to Location Based Services (LBS), Assisted Global Positioning System (A-GPS), and Secure User Plane Location (SUPL) services.

2. Background of Related Art

For a mobile device whose current position is requested, multiple messages are exchanged over an Internet Protocol (IP) network. Messages are passed between the mobile device and a location server to determine the location of the mobile device.

However, in a distributed server environment, current IP based location services systems do not provide a secure and consistent method to allow messages belonging to the same location request to be routed to the correct server. In this environment, messages belonging to the same location session are not guaranteed to be routed to the correct server that initiated the session, often resulting in failed location requests. No conventional system is known to provide a standard and efficient method to manage location sessions in a distributed server environment.

One possible method to correctly route a message when an unsolicited (stray) message is received in one of the distributed servers would be to broadcast to all servers in a distributed server network. However, this would be brute-force and wasteful of communication and processing resources. Moreover, the number of broadcast messages would grow exponentially as the number of distributed servers increases.

Secure User Plane Location (SUPL) is a standards-based protocol that has been developed to allow a mobile handset client to communicate with a location server. The SUPL specification is defined by the Open Mobile Alliance (OMA) standards working group. Refer to OMA Secure User Plane Location Architecture document, OMA-AD-SUPL-V1_0-20060127-C for more details on OMA SUPL call flows; and OMA User Plane Location Protocol document, OMA-TS-ULP-V1_0-20060127-C.

The OMA SUPL Version 1 specifies the following basic call flows: (1) SUPL network initiated (NI) call flow, and (2) SUPL SET initiated (SI) call flow.

FIG. 9 shows typical OMA mobile terminated call flow for a SUPL location request.

In particular, as shown in FIG. 9, messages are passed between a SUPL agent 802 residing in the network, a satellite reference server 804, a SUPL server 806, a PPG 808, and a SUPL Enabled Terminal (SET) 812.

The SUPL server (or SLP) 806 comprises a SUPL Location Center (SLC) and SUPL Positioning Center (SPC). A mobile device is generalized as a SUPL Enabled Terminal (SET) 812. The SLC coordinates operations of SUPL communications in the network, and communicates with the SPC component. The SPC Provides GPS assistance data to the SET 812, and performs precise position calculation of a SET 812.

The SLP can operate in either Proxy or Non-Proxy. In the Proxy Mode, the SET communicates with the SPC using the SLC as a proxy during a precise location fix calculation, whereas in the Non-Proxy Mode, the SPC communicates with the SET directly to perform the precise position calculation.

As shown in FIG. 9, a call flow routing problem exists in network initiated SUPL positioning requests. For instance, network initiated location requests 820 arrive at the SUPL server 806 via an MLP interface. The SUPL server 806 processing this network initiated request is required to send a trigger message (SUPL INIT message) 822 to the SET 812 for validating and initiating a SUPL positioning session 828. The trigger message 822 is sent to the SET 812 as a push message 824 from the PPG 808 (or as an SMS message from an SMSC/MC). At that point, the SET 812 needs to establish a secure TCP/IP connection to the SUPL server 806 to respond to the SUPL positioning request.

However, when a wireless provider has multiple SUPL servers in an active-active configuration for redundancy, the connection request from the SET 812 may be established with a SUPL server that did not initiate this transaction. This can result in positioning request timeout or termination.

Although the OMA User Plane Location Protocol specification (Refer to OMA User Plane Location Protocol document, OMA-TS-ULP-V1_0-20060127-C) defines fields within the SUPL INIT message 822 that can be used for routing incoming SUPL messages from the SET 812, there are loopholes that can result in a routing failure. According to the SUPL standard, a session ID is a unique value consisting of two parts: the server portion (SLP Session ID) and the handset portion (SET Session ID). The SLP 806 can specify its address within the SLP Session ID parameter and also within an optional "SLP Address" field of the ULP SUPL INIT message. Nevertheless, routing can fail because of the following potential reasons: First, the "SLP Address" field is optional for Proxy mode, and SLP vendors may choose not to use it. Second, some SUPL server vendors might include a public FQDN in the SLP Session ID that cannot be resolved for routing to a specific SUPL server instance. Moreover, the SET 812 can choose to ignore the value of the "SLP Address" field of SUPL INIT message in favor of a pre-provisioned SUPL server address in the SET. Furthermore, the SUPL server 806 might specify its own local interface address in the "SLP Address" or "SLP Session Id" field, but since it might be its address within a Virtual LAN, it is not guaranteed to be unique across the carrier's geo-diverse network.

The problem may not be visible if the carrier is using only a single SUPL server 806, but generally this is not the case. Typically a wireless carrier has multiple geo-diverse SUPL servers for load sharing, redundancy and ensuring service availability. When the SET 812 connects to a SUPL server 806 using FQDN or a pre-provisioned well known SLP address, a switch/router within the carrier's networks attempts to resolve the request to a specific SUPL server instance. However, there is a probability that the SUPL server that receives the request from the SET might not be the initiator of the SUPL positioning session, thus causing many network initiated positioning requests to fail, timeout or to result in undefined behavior.

One unexpected behavior of the above problem where the privacy of a subscriber can be compromised is when the SUPL server 806 already has a cached position and tries to obtain consent from the SET 812 for returning the cached position to the external SUPL agent 802. If the notification and verification type at SLP 806 is set to "allowed on no answer" and the SET consent denial message fails to reach the proper SUPL server 806, the SLP 806 may disclose the cached SET position to a unauthorized external entity.

SUMMARY OF THE INVENTION

In accordance with the principles of the present invention, a location session manager comprises a SUPL session router, and a session record manager. The session record manager creates a SUPL session record upon receipt of a SUPL location request from a network SUPL agent to a mobile device. The session record manager also retrieves the SUPL session record upon receipt of a subsequent message relating to the SUPL session. The session record manager also deletes the SUPL session record upon completion of a corresponding SUPL session.

A method of managing a network initiated SUPL location request in a network comprises a plurality of SUPL servers in accordance with another aspect of the invention comprises capturing a network initiated SUPL location request in a SUPL session router. Subsequent messaging relating to the SUPL location request is passed between a mobile device and a selected one of the plurality of SUPL servers assigned to handle the SUPL location request, through the SUPL session router. The subsequent messaging is routed to the selected one of the plurality of SUPL servers handling the SUPL location request.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
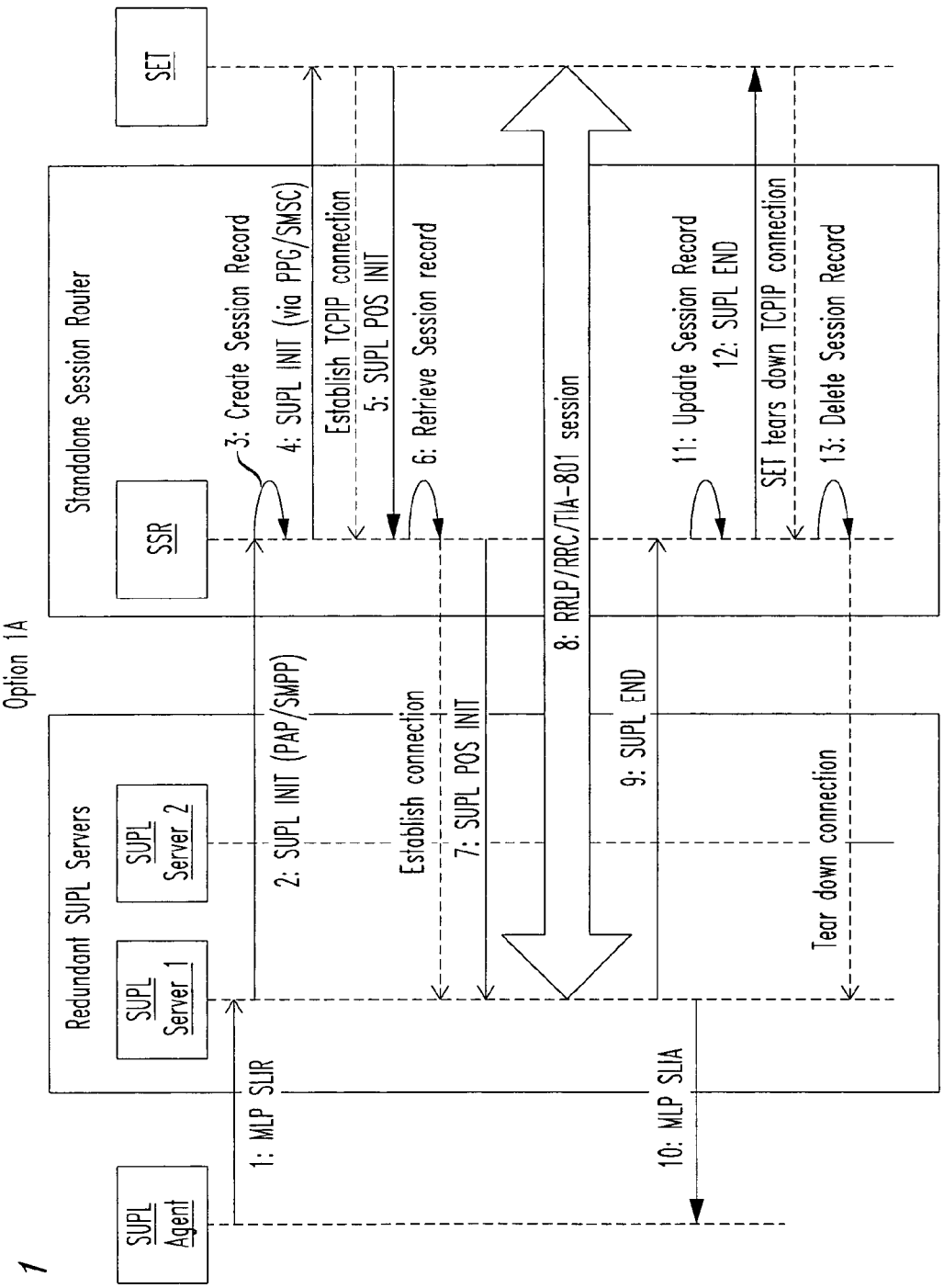
FIG. 1 shows a network initiated (SET based or SET assisted), non-roaming successful call flow in proxy mode, in accordance with the principles of the present invention.

Six inventive architectures and methods are disclosed and implemented dependent upon the nature of the network architecture of the deployed location servers. Each of the disclosed architectures and methods avoid disadvantages associated with conventional architecture and methods, and ensures proper routing of messages to the correct SLP (or SUPL server). Although SET initiated (SI) call flows do not have similar routing problems as described with respect to network initiated (NI) call flows, use of the invention results in load balancing responsibilities shared with other network entities.

Option 1: Standalone Session Router—where the session router manages sessions.

Option 2: Embedded Session Routing in the existing server—where the initiating IP address is embedded in the SLP session ID.

Option 3: Standalone Session Router using full URL in the extended protocol.

Option 4: Embedded Session Correlation Key in the extended protocol—where the SLP session ID is extended with a correlation key to hold identifying information for the initiating SLC for network-initiated requests.

Option 5: Standalone Session Router (SSR) with Correlation Key in the extended protocol—where the IP address or an identifying parameter is included in the new correlation key field and is used by the SSR to route the network-initiated session to the initiating SLP.

Option 6: Standalone Session Router with appended Correlation Key in the extended protocol—where the IP address or an identifying parameter included in the new correlation key field is added to outgoing messages to the SET and is used by the SSR to route the network-initiated session to the initiating SLP.

Option 1—Standalone Session Router

Standalone Session Router (SSR) is a component that intelligently routes OMA SUPL positioning messages between a SET and a SUPL Server. The primary responsibility of the SSR is to ensure that OMA SUPL positioning messages from the SET always terminate at the correct instance of SUPL server.

Preferably the SSR is an air interface independent component that sits between redundant SUPL servers in the carrier's network and the SET. The SSR intercepts both outgoing and incoming SUPL messages and has built-in capabilities to route and load balance SUPL positioning messages to their respective destinations. The SSR can be used within a carrier's network to route SUPL messages when SUPL servers from different vendors are used by the same carrier.

The SSR architecture and methodology does not require any changes to the existing implementation of SET or SUPL servers, and thus can be integrated seamlessly into the wireless carrier's network. The disclosed architecture can preferably interoperate with any OMA SUPL Ver. 1 compliant SUPL server from any vendor, as well as with any OMA SUPL Ver. 1 compliant SET from any vendor.

Architecture

The SSR acts as an intelligent router for OMA SUPL Ver. 1.0 messages when multiple redundant, geo-diverse SUPL servers are deployed in an active-active configuration within a wireless carrier's network. The SSR acts as a middleman for all SUPL positioning messages between the SET and the SUPL servers. The SSR stores session information for all pending and ongoing SUPL positioning sessions in internal tables for routing and load balancing purposes. The external interfaces of the SSR talk and understand OMA ULP messages only.

A SUPL Location Center (SLC) serves as a gateway for a SUPL server. It is responsible for managing connections to other network nodes, including the SET, and for ensuring optimal network performance. The SLC module contains the following major components: External interface, session management, transaction management, cache management, and network location interface.

The external interface supports the Le interface and implements the OMA Mobile Location Protocol (MLP) 3.2.0. This interface serves as the connection point between the SLC and external location services clients (i.e., LCS clients). In the disclosed implementation, the external interface connects directly to another SUPL server by accepting a Push Access Protocol (PAP) message.

The session routing function generates a unique session ID for each transaction and manages sessions within a locally redundant system or across geo-redundant systems.

The transaction management regulates the flow of location requests to protect both the location server itself and the wireless network. By using transaction management, the system can be configured to optimize the rate at which location requests are processed.

Cache management supports use of an internal position cache. This cache can be configured to allow cached information to be used to serve incoming location requests, therefore increasing the efficiency of the system and saving network resources.

The network location interface interfaces with other nodes within the wireless network. The network location interface supports all standard Internet protocol (IP) interfaces. A Lup interface accepts and manages the ULP connection generated by a SET. A WAP push formats and sends a Push access protocol (PAP) message to a Push proxy gateway.

The disclosed SUPL server preferably supports the following location service procedures: Network initiated location requests, and SET initiated location requests. The location service application typically initiates a network initiated location request, and the network triggers an appropriate procedure to position the target SET. The SET requests its own location or location assistance data with a SET initiated location request with ciphering keys from the network. The SUPL servers require a data connection between geo-redundant sites that support transmission of multicast traffic.

Connection Management

The SSR establishes a new TCP/IP connection with a SUPL server instance when a SET connects to it and requests delivery of SUPL positioning messages. For network initiated (NI) call flows, the SSR determines the SUPL server instance based on stored routing information. For SET initiated (SI) call flows, the SSR intelligently identifies a SUPL server instance based on an internal load sharing algorithm.

Preferably the TCP/IP connection with the SUPL server is maintained as long as the SET does not tear down the TCP/IP connection with the SSR, or if the connection times out due to inactivity.

The SSRs have the capability to negotiate and accept secure TCP/IP (TLS) connections from the SET. Each SSR is loaded with server root certificates provisioned in the SET. Additionally, the SSRs can be configured to establish a TLS session with the SUPL server for each incoming SUPL session, exactly mimicking a SET. This enhances end to end security and avoids software changes to the SUPL server.

The SSR can support multiple connections from the same SET, and has the ability to establish multiple (secure or non-secure) connections with a SUPL server instance.

If a SET terminates the TCP/IP (TLS) connection to the SSR, the SSR will remove all session routing records for that connection and immediately tears down the corresponding TCP/IP connections with the SUPL server(s).

On the other hand, if a serving SUPL server terminates the TCP/IP (TLS) connection to the SSR, the SSR will remove the session routing records and immediately tears down the corresponding TLS connection with the SET. Preferably the SSR does not format SUPL END messages on its own based on error conditions.

Redundancy

Accordingly, redundancy is permitted because there can be multiple instances of an SSR, forming a redundant configuration. Each instance of the SSR has the capability to communicate with other peer SSRs. This can be over a dedicated, long-lived TCP/IP connection, multicast interface, or any other protocol as deemed appropriate for a specific SSR configuration.

Routing Key

The intelligence of the SSR is stored within its internal routing tables. The routing table entries are created on a per session basis and live as long as the SUPL session is alive. A routing entry is created when a new SUPL positioning session (SI or NI) is initiated and removed when the session is complete (either successfully or in error).

The SSR session routing record preferably has the following fields.

| ULP SET Session ID | ULP SLP Session ID | SSR SLP Session ID | MSISDN | Serving SLP Address | SET Connection ID | SLP Connection ID |
|---|---|---|---|---|---|---|

Session records need to be retrieved or checked only at the beginning of each SUPL positioning call flow. For the case of a network initiated (NI) call flow, the retrieved session record determines the instance of the SUPL server processing the positioning request. For SET initiated (SI) call flows, the routing table is queried to determine a SUPL server instance for load sharing purposes.

The routing table can be formed in-memory, or can be made persistent by storing the information in a database or memory mapped files. If the routing record is non-volatile, the session information is not lost when an instance of the SSR dies abnormally.

Preferably stale session routing records are purged automatically within the SSR, and the associated resources are released.

SSR SLP Session ID

The SSR generates a unique SLP Session identifier for each new call flow. The SSR creates its own SLP Session ID, as the SLP Session ID from the SLP might not be unique across multiple SUPL servers. In this way, the SSR generated SLP Session ID is guaranteed to be unique across all SSR instances in a redundant deployment configuration. A unique SSR SLP Session ID also enables the carrier to use SUPL servers from multiple vendors simultaneously. The SSR generated SLP Session ID is further augmented to include a unique identifier to help identify the SSR which owns the session record.

When a serving SSR fails to retrieve the routing information for a particular network initiated (NI) SUPL session, it examines the SSR generated SLP Session ID and retrieves the address of the owner SSR. The serving SSR then transfers ownership of the routing record from the peer SSR, and completes the SUPL session call flow.

This SSR generated SLP session ID is substituted for the SLP generated SLP Session ID in all outgoing SUPL message to the SET. In the reverse direction the original SLP session ID is replaced in SUPL messages to the target SUPL server.

Network Initiated Call Flows

To support network initiated (NI) call flows, the session router (i.e., standalone session router or integrated session router, collectively referred to as SSR) is configurable to accept a WAP Push from any SUPL server that is compliant with the OMA SUPL V1 specification. The SSR, upon receipt of the SUPL INIT message, creates a unique session from information included in the SLP Session ID, and forwards the PAP message to the designated Push proxy gateway, e.g., within a WAP gateway. The acknowledgement message received from the PPG is preferably also returned to the originating SUPL server.

Any SSR may receive the corresponding SUPL POS INIT message from the SET via the common IP subnet. Along with managing the connection and data security with the SET, the SSR determines the originating SUPL server, and forwards the SUPL POS INIT to that server. An IP tunnel is then established between the SET and SUPL server until the SUPL END message is sent from the SUPL server, at which point the SSR may tear down the IP connection between the two entities provided no other ongoing sessions exist with the SET.

Thus, network initiated (NI) call flow starts with a SUPL INIT message sent by the SLP to the SET via a PPG or SMSC/MC. This message only has the SLP Session ID as the SET populates the SET Session ID. The SSR intercepts the SUPL INIT message from the SLP to create a new session record in the routing info table.

When the SET responds to the SUPL INIT with a SUPL POS INIT message, the request initially comes to the SSR. The SSR performs a lookup of the SSR Session ID to retrieve the routing information for the session. The record is then updated with the SET Session ID and sent to the correct SUPL server instance in the wireless carrier's network.

SET Initiated Call Flows

The wireless carrier is provisioned to terminate SUPL connection requests for SET initiated (SI) positioning requests to the serving SSR via the GGSN. Once the SET establishes a TLS connection with the SSR, the SSR determines an instance of SUPL Server and creates a routing record for the session. The SSR then connects to the SUPL server and forwards the SUPL messages to the serving SUPL server.

A SET initiated SUPL location request can send multiple requests over the same TLS connection. The SSR can intelligently route any new location request within the same connection to another instance of SUPL server if the serving SUPL server is handling many requests. This means for one TLS connection from the SET there can be multiple TCP/IP connections to several instances of SUPL servers handling each location request. The respective connection identifiers in the session routing record correlate the connection between SET and the SUPL servers.

Routing Record not Found by SSR

If the SSR cannot retrieve the routing record for a specific session, it disconnects from the SET. This could be due to session timeout or loss of the owner SSR.

SUPL Session ID

For the session router to assign and manage unique sessions for network initiated requests, a unique session identifier is required. The OMA SUPL V1 standard stipulates that the SLP session ID must be globally unique to meet the SUPL specification for session ID uniqueness. This requires the session ID field (part of the SLP session ID) to be unique for a particular SLP and the SLP ID must be unique across SLPs. If a SUPL server is not compliant with this part of the OMA SUPL V1 standard, then a pseudo-uniqueness approach may be implemented. For instance, a unique session ID+SET ID may be used to otherwise meet the OMA SUPL V1 standard stipulating SLP session ID uniqueness.

Preferably, the session router (SSR) supports either a FQDN or an IP address. A FQDN that resolves to a specific host or SLP can be used. A globally unique FQDN resolving to multiple SLPs would not meet the SUPL session ID uniqueness requirement. However, a mapping of NAT to VIP may be supported.

Connections to Session Router (SSR)

Preferably, the SSR terminates the SET-SSR connection. The SSR is preferably provisioned with a server root certificate provisioned within the SETs. Additionally, the SSR is preferably configured to establish a TLS session to the SUPL server to ensure end-to-end security.

Figure 8:
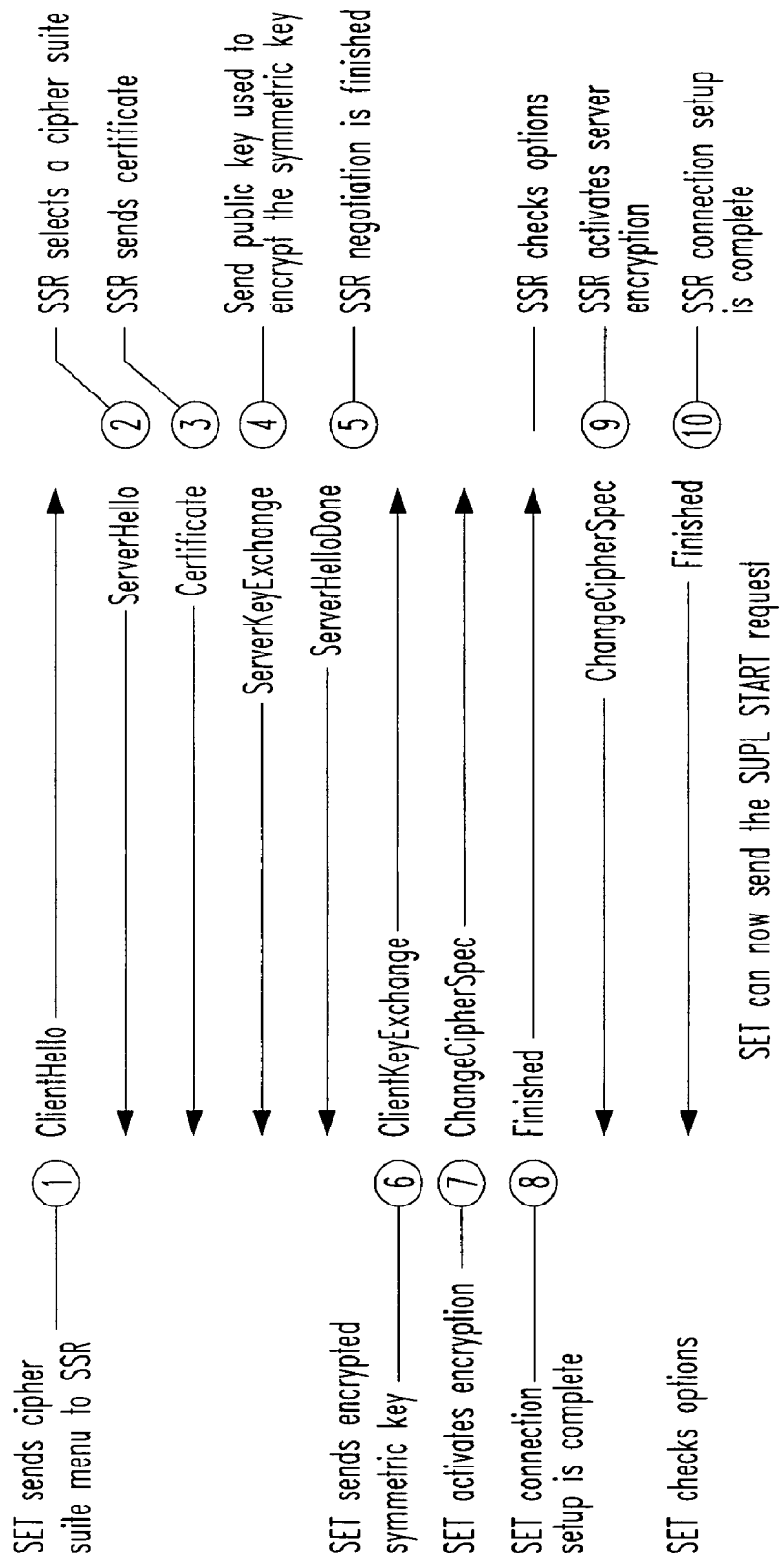
FIG. 8 illustrates exemplary security setup for a Standalone Session Router (SSR), in accordance with the principles of the present invention.
Figure 9:
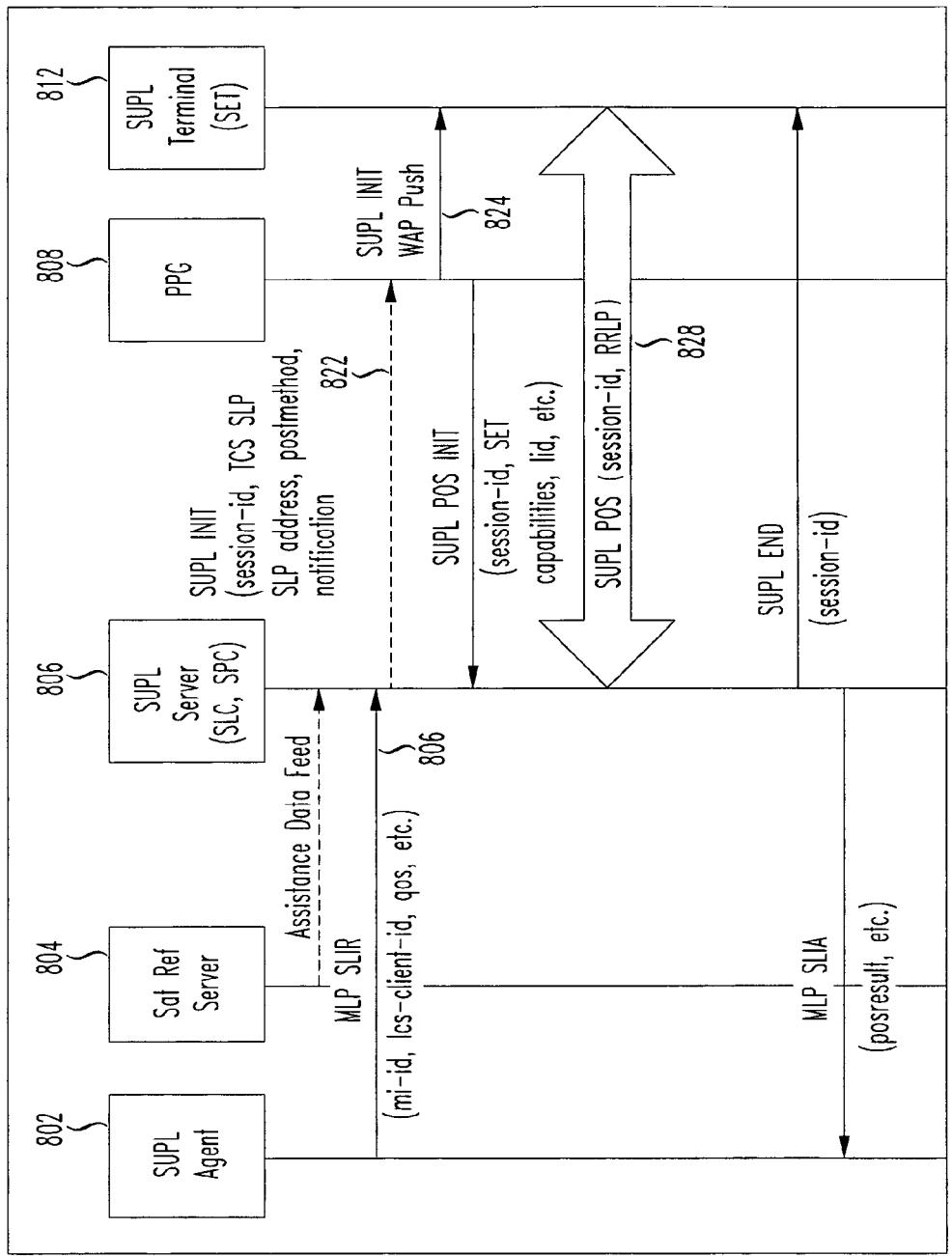
FIG. 9 shows typical OMA mobile terminated call flow for a SUPL location request.

FIG. 8 illustrates exemplary security setup for a session router (SSR), in accordance with the principles of the present invention.

Call Flows

Figure 2:
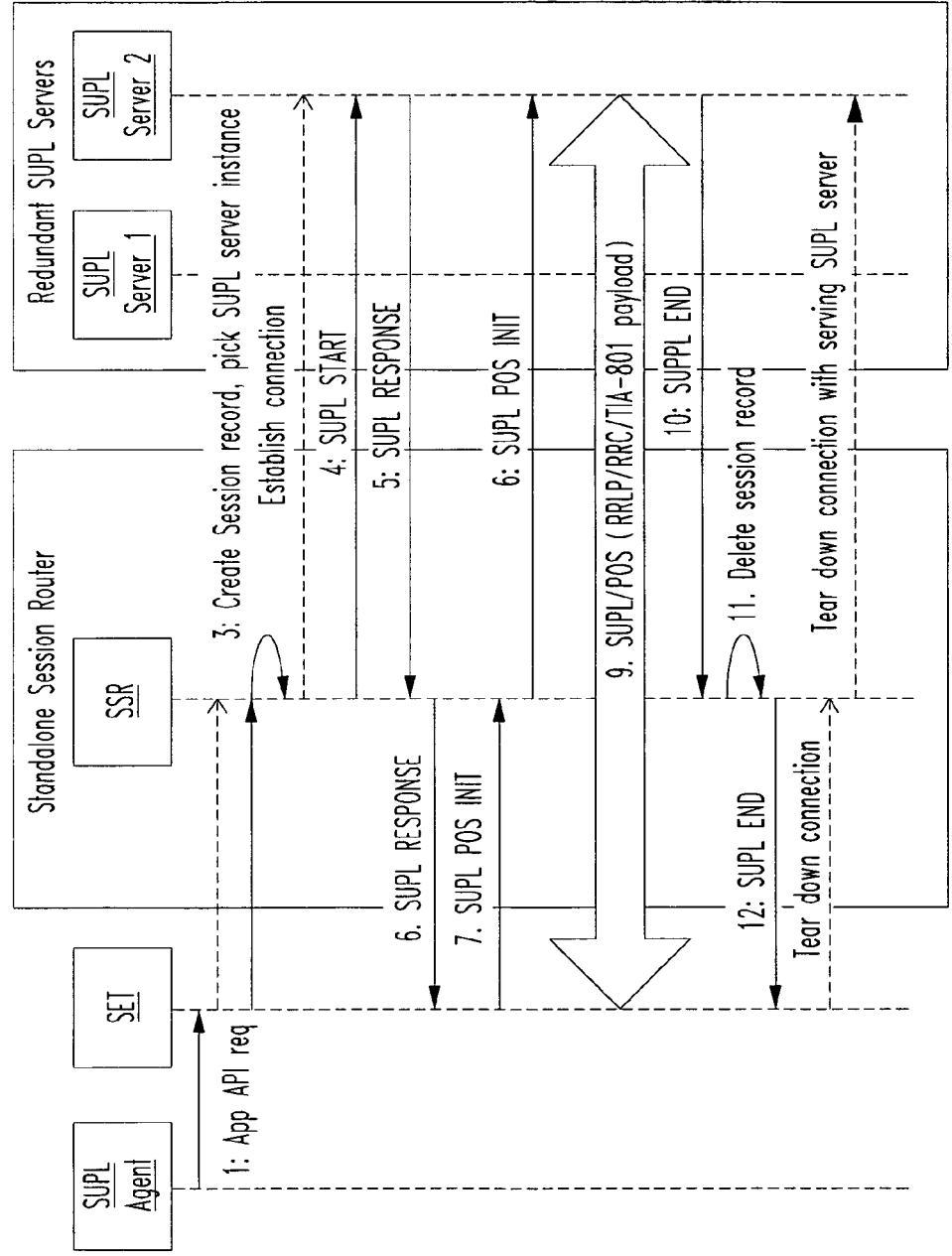
FIG. 2 shows SET initiated (SET based or SET assisted call flows), non-roaming successful call flow in proxy mode, in accordance with the principles of the present invention.

FIGS. 1 and 2 disclose two basic call flows illustrating how the inventive solution described with respect to Option 1 interacts with the existing SUPL call flow and architecture.

FIG. 1 shows a network initiated (SET based or SET assisted), non-roaming successful call flow in Proxy mode, in accordance with the principles of the present invention.

In step 1 of FIG. 1, a SUPL Agent (LCS client) sends an MLP SLIR message to a SUPL server requesting location of a SET.

In step 2, the SUPL server determines that it needs to initiate a positioning session with the SET, and sends a trigger message via PPG or SMSC to notify the SET of the SUPL location request.

In step 3, the SSR intercepts the PAP message from the SUPL server instance, and creates a session record in its routing table. The SSR creates a new SLP Session ID and replaces the original SLP Session ID with this new value in the outgoing SUPL INIT message.

In step 4, the SSR sends the trigger message via the external entity (PPG/SMSC/MC) in the carrier's network, and sends a response back from the external entity (PPG/SMSC/MC) to the SUPL server instance. A session timer can be started here.

In step 5, the SET sends a SUPL POS INIT message to the SSR after establishing a TLS connection with the SSR.

In step 6, the SSR parses the incoming ULP message, and queries the routing table for the serving SUPL server address.

In step 7, upon successful retrieval of routing information, the SSR establishes a TCP/IP connection with the SUPL server (secured or non-secure). It substitutes the SLP Session ID with the original value from the session routing record, and sends the ULP SUPL POS INIT message to the SUPL server. It is assumed that since the SSR is residing within the carrier's network, it can directly communicate with the SUPL server In step 8, the serving SUPL server and SET exchange multiple SUPL POS messages with the supported positioning protocol (RRLP/RRC/IS-801) payload until the positioning session is complete. These ULP messages pass through the SSR, which substitutes the SLP session identifier and updates the session record with the session state for each transaction.

In step 9, at the end of a successful positioning session, the serving SUPL server sends a SUPL END message to the SSR over the previously established TCP/IP connection.

In step 10, the serving SUPL server returns the location of the SET within the MLP SLIA message to the external SUPL agent (LCS client).

In step 11, upon receipt of a SUPL END message from the SUPL server, the SSR updates the session record with the session state, and substitutes the SLP session identifier with the SSR generated session identifier stored in the session routing record.

In step 12, the SSR sends the SUPL END message to the SET over the TLS connection established in step 5.

In step 13, the SET, upon receipt of a SUPL END message, tears down the TLS connection with the SSR, which causes the SSR to delete the session record it owned. The SSR then terminates the connection with the serving SUPL server if not configured to use long-lived TCP/IP connections.

FIG. 2 shows the other basic call flow illustrating how the inventive solution of Option 1 interacts with existing SUPL call flow and architecture. In particular, FIG. 1 shows SET initiated (mobile station based or mobile station assisted call flows), non-roaming successful call flow in proxy mode, in accordance with the principles of the present invention.

In step 1, the SUPL agent (application in the SET) initiates a location request using the application API.

In step 2, the SET establishes a TLS connection with the SSR, and sends a SUPL START message to the SSR.

In step 3, the SSR parses the incoming ULP message. Since it is a SUPL START message, a new session record is created, and a serving SUPL server is identified using appropriate load balancing algorithms. This session record is preferably not used for routing purposes, but instead to simply identify the loading on each SLC instance.

In step 4, upon successful determination of a serving SUPL server, the SSR establishes a TCP/IP connection with the SUPL server (secured or non-secure). It is assumed that since the SSR is residing within the carriers network, it can communicate directly with the SUPL server instance.

In step 5, the serving SUPL server sends a SUPL RESPONSE message to the SSR.

In step 6, the SSR forwards a SUPL RESPONSE message to the corresponding SET over the previously established TLS connection.

In step 7, the SET returns a SUPL POS INIT message to the SSR.

In step 8, the SSR forwards the SUPL POS INIT message to the serving SUPL server over the previously established TCP/IP connection.

In step 9, the serving SUPL server and SET exchange multiple SUPL POS messages with the supported positioning protocol (RRLP/RRC/IS-801) payload until the positioning session is complete.

In step 10, at the end of a successful positioning session the serving SUPL server sends a SUPL END message to the SSR over the previously established TCP/IP connection.

In step 11, upon receipt of a SUPL END message from the SUPL server, the SSR deletes the session record from the session routing table.

In step 12, the SSR sends a SUPL END message to the SET over the previously established TLS connection. The SET, upon receipt of a SUPL END message, tears down the TLS connection with the SSR. This causes the SSR to terminate the TCP/IP connection with the serving SUPL server.

Option 2—Embedded Session Manager Routing

Figure 3:
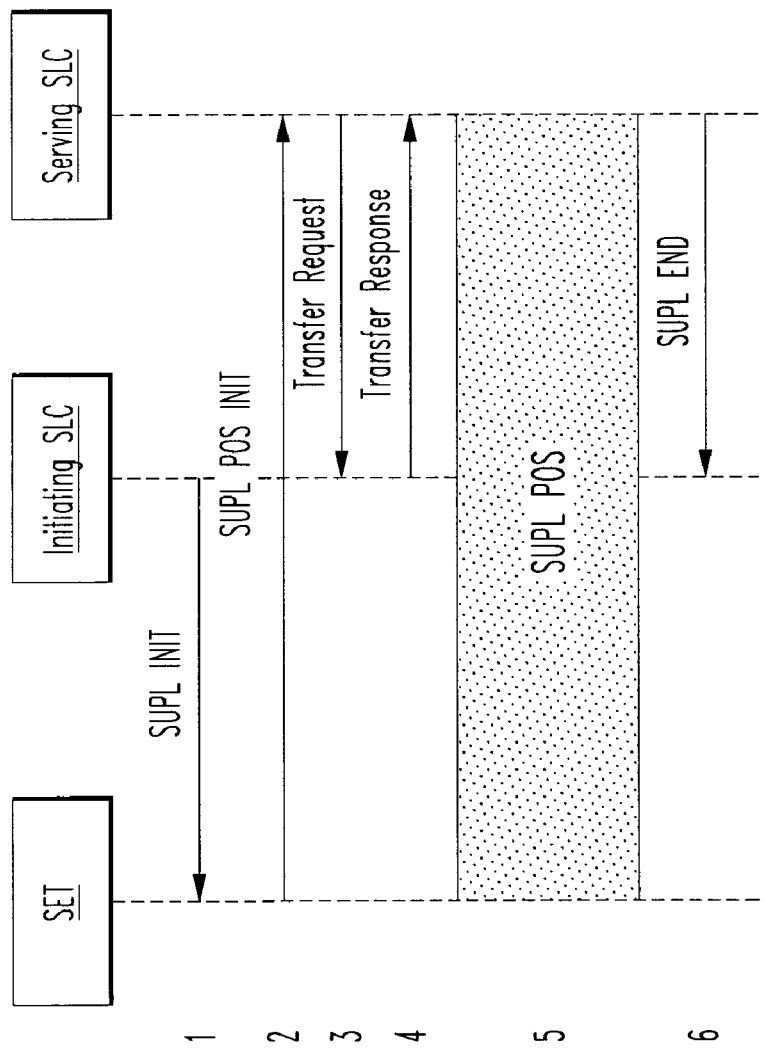
FIG. 3 shows embedded session management showing session routing from the initiating SLC to the serving SLC for network-initiated non-roaming proxy mode, successful case, in accordance with the principles of the present invention.

FIG. 3 shows embedded session management showing session routing from the initiating SLC to the serving SLC for network-initiated non-roaming proxy mode, successful case, in accordance with the principles of the present invention.

In particular, as shown in FIG. 3, instead of having an external component to coordinate messages between network components, the routing mechanism is performed within the SLP in this solution. While the call flow shown in FIG. 3 describes messaging in a successful scenario, the same routing mechanism applies equally to error scenarios.

In step 1 of FIG. 3, the initiating SLC sends a SUPL INIT trigger message to the SET by populating the SLP session identifier with the IP address of the initiating SLC.

In step 2, the SET populates the SET session identifier portion of the session identifier, establishes a TCP/IP connection with the serving SUPL server (secured or non-secure) and sends a SUPL POS INIT message.

In step 3, the serving SLC receives a SUPL POS INIT message in response to a SUPL INIT trigger message. The embedded session router extracts the SLP session ID to route the message directly to the initiating SLC. However, to reduce network latency in a distributed geo-diverse deployment of an SLP, an inter-SLC transfer request message is defined that allows the serving SLC to request all session information to be transferred from the initiating SLC to the serving SLC.

In step 4, in response to the transfer request, the initiating SLC transfers ownership of the ongoing session to the serving SLC and responds to the serving SLC with session information. This completes the session routing process.

In step 5, when needed, the SET and the SLC complete the positioning session. (Note that the SPC is not shown in the diagram)

In step 6, the SUPL session completes when a SUPL END message is received from the SET in step 5, or when a SUPL END message is sent from the serving SLC.

Option 3—Standalone Session Router Using Full URL in the Extended Protocol

Figure 4:
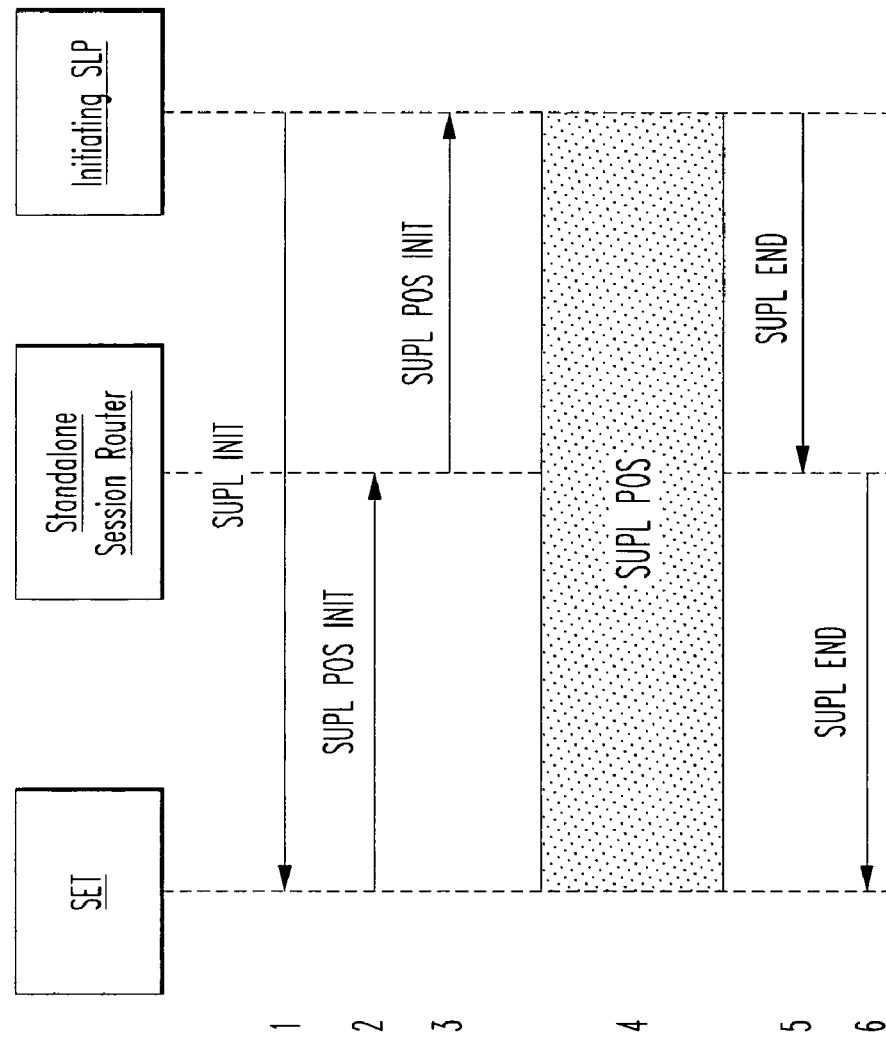
FIG. 4 shows a stand-alone session router with full Uniform Resource Locator (URL) in the extended protocol, in accordance with the principles of the present invention.

FIG. 4 shows a stand-alone session router with full Uniform Resource Locator (URL) in the extended protocol, in accordance with the principles of the present invention.

FIG. 4 is a variant of Option 1. As shown in FIG. 4, the SLP Address is extended in this solution with a full URL to identify the initiating SLP for network-initiated requests. The query string of the full URL contains a unique key to identify the actual initiating SLP.

In step 1, the initiating SLP sends a SUPL INIT trigger message to the SET by populating the SLP Address with the address of the SSR and its unique key.

In step 2, the SET populates the SET session identifier portion of the session identifier, establishes a TCP/IP connection (secured or non-secure) with the SSR and responds back to the trigger message with a SUPL POS INIT response.

In step 3, the SSR receives the incoming SUPL POS INIT message from the SET, extracts the SLP Address and performs a table lookup to resolve the address of the initiating SLP. The SUPL POS INIT message is then sent directly to the initiating SLP.

In step 4, when needed, the SET and the SLP initiate a positioning session.

In step 5, the SUPL session completes when a SUPL END is received from the SET in step 5, or when a SUPL END is sent from the serving SLP.

In step 6, the SSR forwards the SUPL END message to the SET.

Option 4—Embedded Session Correlation Key in the Extended Protocol

Figure 5:
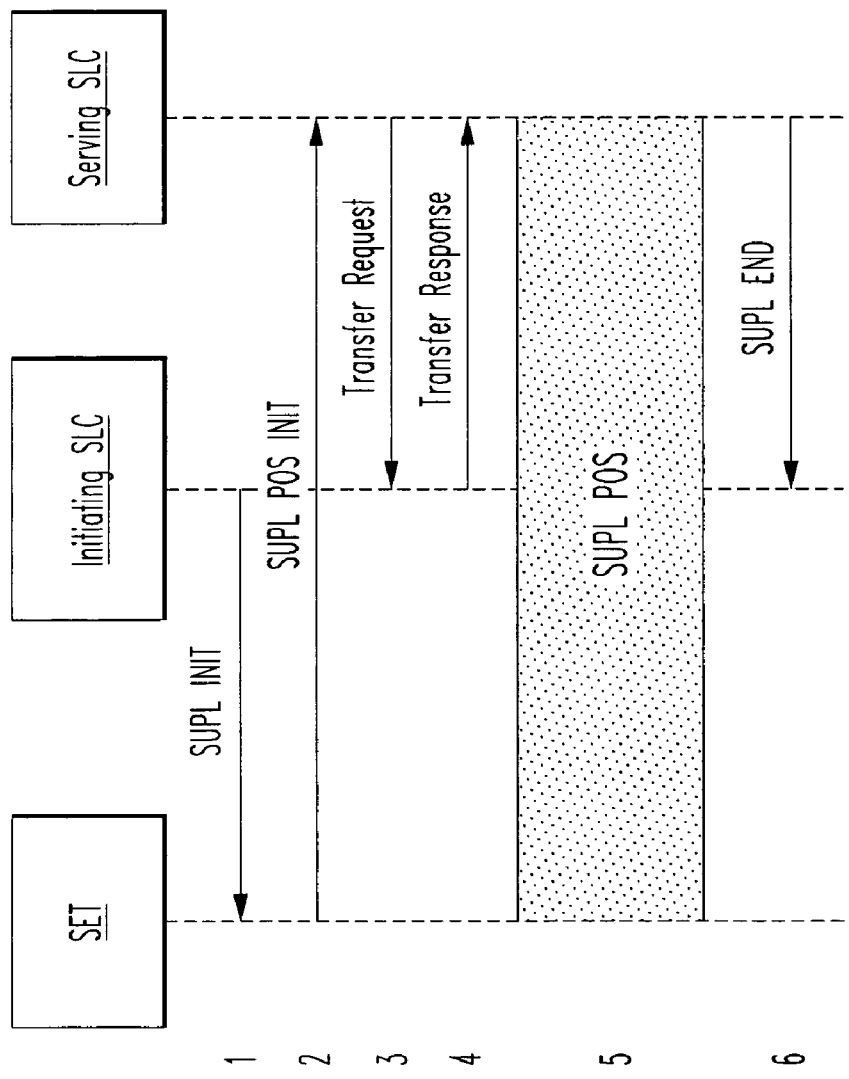
FIG. 5 shows embedded session management showing session routing using a correlation key, in accordance with the principles of the present invention.

FIG. 5 shows embedded session management showing session routing using a correlation key, in accordance with the principles of the present invention.

In particular, the SLP session ID is extended in the embodiment shown in FIG. 5 with a correlation key to hold identifying information for the initiating SLC for network-initiated requests.

In step 1 of FIG. 5, the initiating SLC sends a SUPL INIT trigger message to the SET by populating the correlation key of the SLP session identifier.

In step 2, the SET populates the SET session identifier portion of the session identifier, establishes a TCP/IP connection (secured or non-secure) with the serving SLC and responds back to the trigger message with a SUPL POS INIT response.

In step 3, the serving SLC receives a SUPL POS INIT message in response to a SUPL INIT trigger message. The embedded session router extracts the SLP session ID and can route the message to the initiating SLC using the correlation key. However, to reduce network latency in a distributed geo-diverse deployment of an SLP, an inter-SLC transfer request message is defined that allows the serving SLC to request all session information to be transferred from the initiating SLC to the serving SLC. The serving SLC then handles all subsequent messages for the transaction.

In step 4, in response to the transfer request, the initiating SLC transfers ownership of the ongoing session to the serving SLC, and responds to the serving SLC with session information. This completes the session routing process.

In step 5, when needed, the SET and the SLC complete the positioning session. (Note that the SPC is not shown in FIG. 5)

In step 6, the SUPL session completes when the SUPL END is received from the SET in step 5, or when a SUPL END is sent from the serving SLC.

Figure 6:
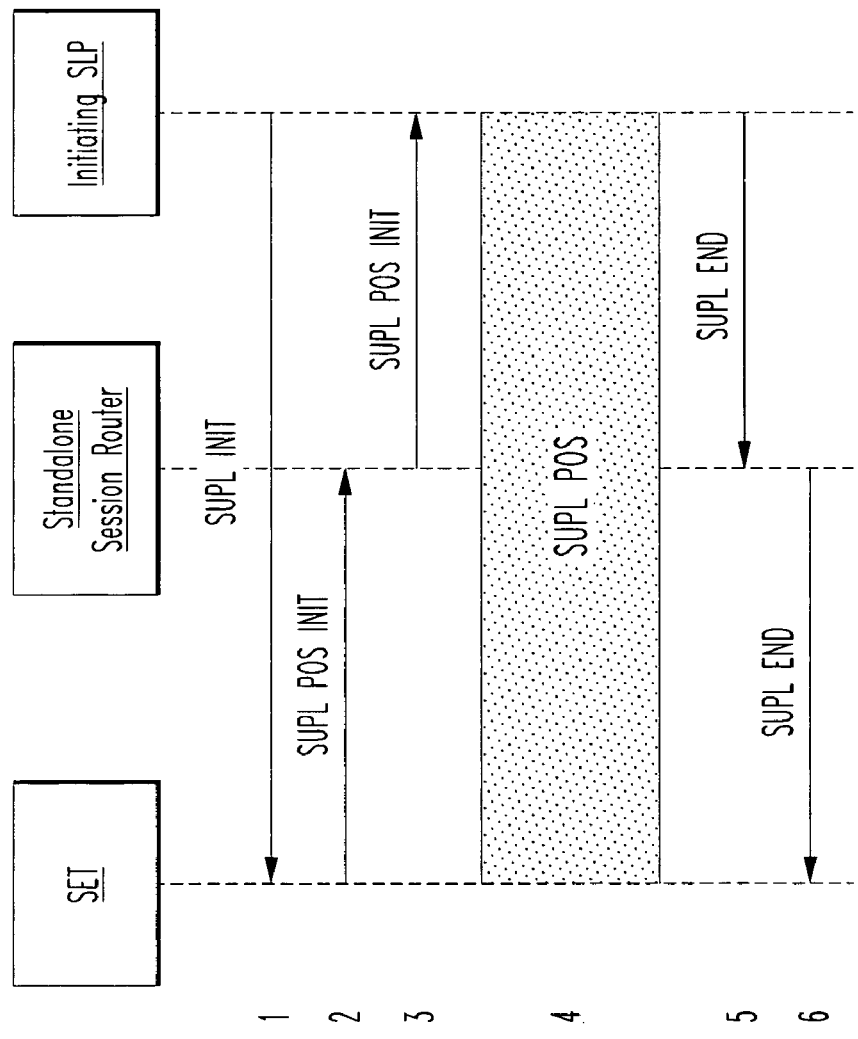
FIG. 6 shows a stand-alone session router showing session routing from the SSR to the initiating SLP, in accordance with the principles of the present invention.

Option 5—Standalone Session Router Using Correlation Key in the Extended Protocol FIG. 6 shows a stand-alone session router showing session routing from an initiating SLP to a serving SLP, in accordance with the principles of the present invention.

In particular, the SLP session ID is extended in the embodiment shown in FIG. 6 with a correlation key to hold identifying information for the initiating SLP for network-initiated requests.

In step 1 of FIG. 6, the initiating SLP sends a SUPL INIT trigger message to the SET by populating the correlation key in the SLP session ID.

In step 2, the SET populates the SET session identifier portion of the session identifier, establishes a TCP/IP connection with the SSR and responds back to the trigger message with a SUPL POS INIT response.

In step 3, the SSR receives the incoming SUPL POS INIT message from the SET, extracts the correlation key, and performs a table lookup to resolve the address of the initiating SLP. The SUPL POS INIT message is then sent directly to the initiating SLP.

In step 4, when needed, the SET and the SLP initiate a positioning session.

In step 5, the SUPL session completes when a SUPL END is received from the SET in step 4, or when a SUPL END is sent from the serving SLP.

In step 6, the SSR forwards the SUPL END message to the SET.

Figure 7:
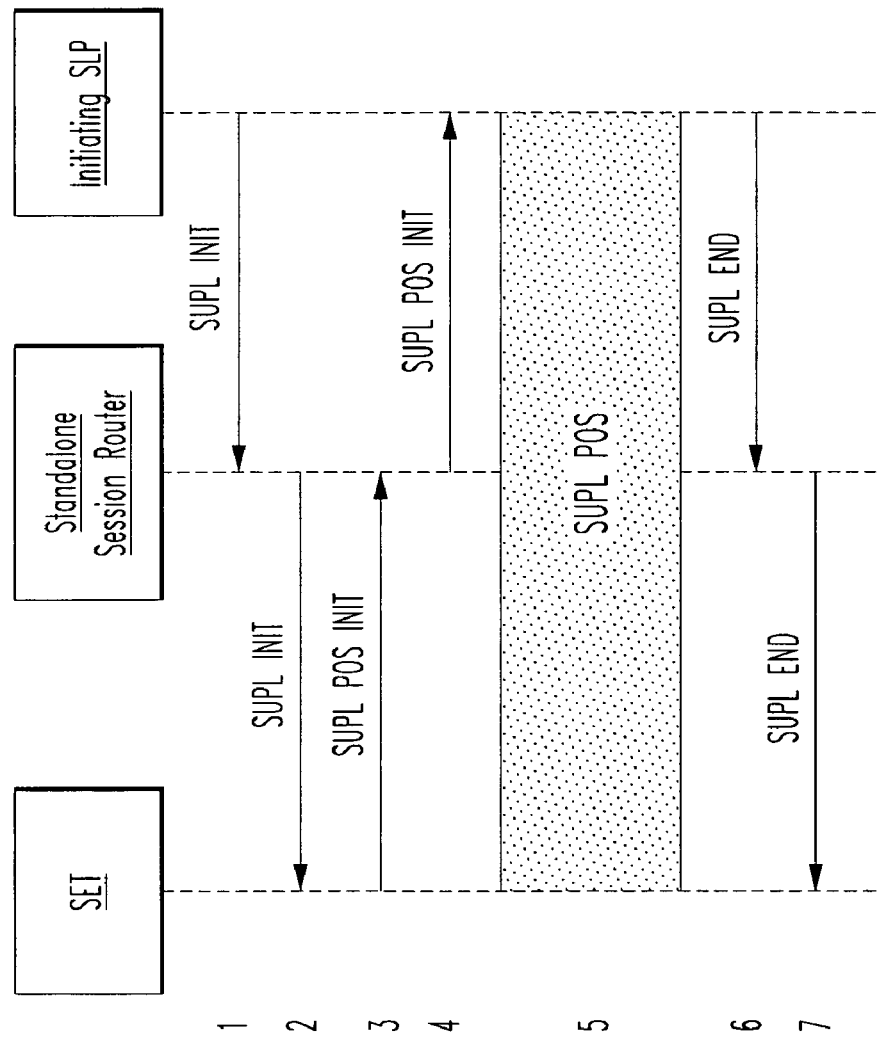
FIG. 7 shows a Standalone Session Router (SSR) showing session routing from the SSR to the initiating SLP, in accordance with the principles of the present invention.

Option 6—Standalone Session Router with Appended Correlation Key in the Extended Protocol FIG. 7 shows a stand-alone session router showing session routing from an initiating SLP to a serving SLP, in accordance with the principles of the present invention.

In particular, as shown in FIG. 7, the SLP session ID is extended by appending a correlation key to hold identifying information for the initiating SLP.

In step 1 of FIG. 7, the initiating SLP sends a SUPL INIT trigger message to the SSR by populating the SLP session identifier.

In step 2, the SSR receives the outgoing SUPL INIT trigger message from the initiating SLP and updates the SLP Session ID with a unique correlation key. It then forwards the SUPL INIT message to the SET.

In step 3, the SET populates the SET session identifier portion of the session identifier, establishes a TCP/IP connection with the SSR and responds back to the trigger message with a SUPL POS INIT response.

In step 4, the SSR receives the incoming SUPL POS INIT message from the SET, extracts the correlation key, and performs a table lookup to resolve the address of the initiating SLP. The SUPL POS INIT message is then sent directly to the initiating SLP with the original SLP Session ID left unchanged.

In step 5, when needed, the SET and the SLP initiate a positioning session.

In step 6, the SUPL session completes when a SUPL END message is received from the SET in step 4, or when a SUPL END message is sent from the serving SLP.

In step 7, the SSR forwards the SUPL END message to the SET.

Benefits of the invention include that fact that the invention as embodied by Options 2, 3 and 4 reduces network latency in cases when the serving SLC is across a WAN connection by transferring the request from the initiating SLC to the serving SLC using an intelligent transfer scheme. The transfer request is only performed when the serving SLC distance is far from the initiating SLC. Moreover, the invention as embodied by Options 1, 5 and 6 provides consistent security protection for the system by handling all aspects of TLS certificates management and enforcement for disparate systems in a consistent manner.

While the invention has been described with reference to the exemplary embodiments thereof, those skilled in the art will be able to make various modifications to the described embodiments of the invention without departing from the true spirit and scope of the invention.

What is claimed is:

1. A location session manager, comprising:
    a secure user plane location (SUPL) session router; and
    a session record manager to create a SUPL session record upon receipt of a SUPL location request, from a network SUPL agent, for a mobile device, to retrieve said SUPL session record upon receipt of subsequent SUPL location request messaging, and to delete said SUPL session record, said SUPL session record providing routing information to route said subsequent SUPL location request messaging to a selected one of a plurality of SUPL servers;
    wherein, for a single SUPL session, said SUPL session record is created, said SUPL session record is retrieved upon receipt of said subsequent SUPL location request messaging, and said SUPL session record is deleted upon completion of said single SUPL session.

2. The location session manager according to claim 1, wherein:
    said SUPL session router is a standalone session router separate from an initiating SUPL agent.

3. The location session manager according to claim 1, wherein:
    said SUPL session router is embedded within an initiating SUPL agent.

4. The location session manager according to claim 1, wherein:
    said SUPL session router stores session information for pending and ongoing SUPL positioning sessions in an internal table, for routing purposes.

5. The location session manager according to claim 4, wherein:
   said storage of said session information is for both routing and load balancing purposes.

6. A method of managing a network initiated SUPL location request in a network comprising a plurality of SUPL servers, comprising:
   capturing a network initiated SUPL location request in a SUPL session router;
   creating a SUPL session record upon receipt of said SUPL location request;
   retrieving a SUPL session record upon receipt of subsequent SUPL location request messaging;
   passing said subsequent SUPL location request messaging between a mobile device and a selected one of said plurality of SUPL servers assigned to handle said SUPL location request, through said SUPL session router; and
   routing said subsequent SUPL location request messaging to said selected one of said plurality of SUPL servers handling said SUPL location request according to routing information stored in said SUPL session record;
   wherein, for a single SUPL session, said SUPL session record is created, said SUPL session record is retrieved upon receipt of said subsequent SUPL location request messaging, and said SUPL session record is deleted upon completion of said single SUPL session.

7. The method of managing a network initiated SUPL location request in a network comprising a plurality of SUPL servers according to claim 6, wherein:
   said SUPL session router is a standalone session router separate from an initiating SUPL agent.

8. The method of managing a network initiated SUPL location request in a network comprising a plurality of SUPL servers according to claim 6, wherein:
   said SUPL session router is embedded within an initiating SUPL agent.

9. The method of managing a network initiated SUPL location request in a network comprising a plurality of SUPL servers according to claim 6, further comprising:
   storing session information for pending and ongoing SUPL positioning sessions in an internal table, for routing purposes.

10. The method of managing a network initiated SUPL location request in a network comprising a plurality of SUPL servers according to claim 9, wherein:
    said storage of said session information is for both routing and load balancing purposes.

11. Apparatus for managing a network initiated SUPL location request in a network comprising a plurality of SUPL servers, comprising:
    means for capturing a network initiated SUPL location request in a SUPL session router;
    means for creating a SUPL session record upon receipt of said SUPL location request;
    means for retrieving a SUPL session record upon receipt of subsequent SUPL location request messaging;
    means for passing said subsequent SUPL location request messaging between a mobile device and a selected one of said plurality of SUPL servers assigned to handle said SUPL location request, through said SUPL session router; and
    means for routing said subsequent SUPL location request messaging to said selected one of said plurality of SUPL servers handling said SUPL location request according to routing information stored in said SUPL session record;
    wherein, for a single SUPL session, said SUPL session record is created, said SUPL session record is retrieved upon receipt of said subsequent SUPL location request messaging, and said SUPL session record is deleted upon completion of said single SUPL session.

12. The apparatus for managing a network initiated SUPL location request in a network comprising a plurality of SUPL servers according to claim 11, wherein:
    said SUPL session router is a standalone session router separate from an initiating SUPL agent.

13. The apparatus for managing a network initiated SUPL location request in a network comprising a plurality of SUPL servers according to claim 11, wherein:
    said SUPL session router is embedded within an initiating SUPL agent.

14. The apparatus for managing a network initiated SUPL location request in a network comprising a plurality of SUPL servers according to claim 11, further comprising:
    means for storing session information for pending and ongoing SUPL positioning sessions in an internal table, for routing purposes.

15. The apparatus for managing a network initiated SUPL location request in a network comprising a plurality of SUPL servers according to claim 14, wherein:
    said storage of said session information is for both routing and load balancing purposes.

* * * * *